April 2, 1968  F. M. IRVING, JR  3,375,917
BAKERY PRODUCT SUCTION TRANSFER APPARATUS
Filed Jan. 17, 1967  2 Sheets-Sheet 1
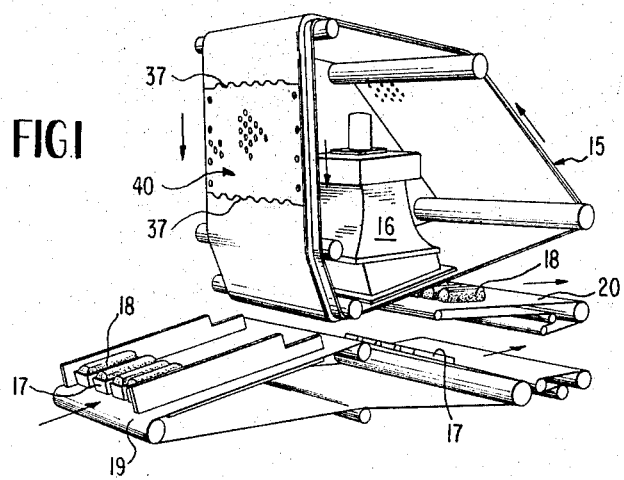
INVENTOR
FRANK M. IRVING, JR.
BY Wynne + Finken
ATTORNEYS April 2, 1968  F. M. IRVING, JR  3,375,917
BAKERY PRODUCT SUCTION TRANSFER APPARATUS
Filed Jan. 17, 1967  2 Sheets-Sheet 2

INVENTOR
FRANK M. IRVING, JR.

BY *Wynne + Finken*
ATTORNEYS

3,375,917
BAKERY PRODUCT SUCTION TRANSFER APPARATUS

Frank M. Irving, Jr., York, Pa., assignor to Alto Company, York, Pa., a partnership
Filed Jan. 17, 1967, Ser. No. 609,849
3 Claims. (Cl. 198—179)

ABSTRACT OF THE DISCLOSURE

An endless belt for vacuum suspension of bakery products, the belt having a backing sheet and a product engaging skin; a plurality of closely spaced conical passages through the belt to present a plurality of the larger openings of the passages to each product for delicate handling thereof; and the exposed surface of the skin including the passages being pliable and more dense than the interior body thereof to present a smooth wearing face to the product. Preferably, the holes in the backing sheet of the belt are larger than the mating passages to facilitate alignment and the skin of the belt is made up of a plurality of removable mats.

---

This invention relates to a bakery product transfer device and specifically to the combination of elements which make up the endless vacuum belt which contacts and lifts the delicate bakery products.

The endless belt of the instant invention may be used with the apparatus disclosed in the U.S. Patent No. 3,080,079 entitled, "Transfer Mechanism," which issued on Mar. 5, 1963. Also, the instant belt is suitable for use with the apparatus disclosed in the U.S. Patent No. 3,168,958 entitled "Transfer Mechanism for Bread Rolls and the Like" which issued on Feb. 9, 1965.

Improved product handling is attained by applying a large number of individual suspension forces to such delicate bakery product, such as bread and rolls. The instant invention accomplishes this by the provision of a large number of relatively small conical passages formed in a product engaging skin of predetermined thickness and softness which distorts upon contact with the product and thereby prevents damage. Preferably, the product engaging skin has an exposed surface of a more dense consistency than the interior body thereof to provide a smooth wearing face which can be maintained in a high state of cleanliness. Also, it is preferred that the product engaging skin be made up of a longitudinally extending series of transverse mats which can be removably connected to a lower rigid base or backing sheet, the holes in the backing sheet being larger than the internal openings of the conical passages to facilitate alignment. Preferably, the mats involve a unified outer skin and an intermediate rigid backing section which connects to the backing sheet.

Other objects and advantages of the present invention will be apparent upon reference to the accompanying description when taken in conjunction with the following drawings, wherein.

FIGURE 1 is a perspective view of a portion of the apparatus shown more completely in the above mentioned U.S. Patent No. 3,168,958, the belt of the instant invention being mounted thereon;

FIGURE 2 is a transverse cross section of a portion of the belt showing the removability feature;

FIGURE 3 is a transverse cross section of an integrated belt shown in position for depanning bread;

FIGURE 4 is a view similar to FIGURE 3 with the belt depanning individual rolls.

Figure 5:
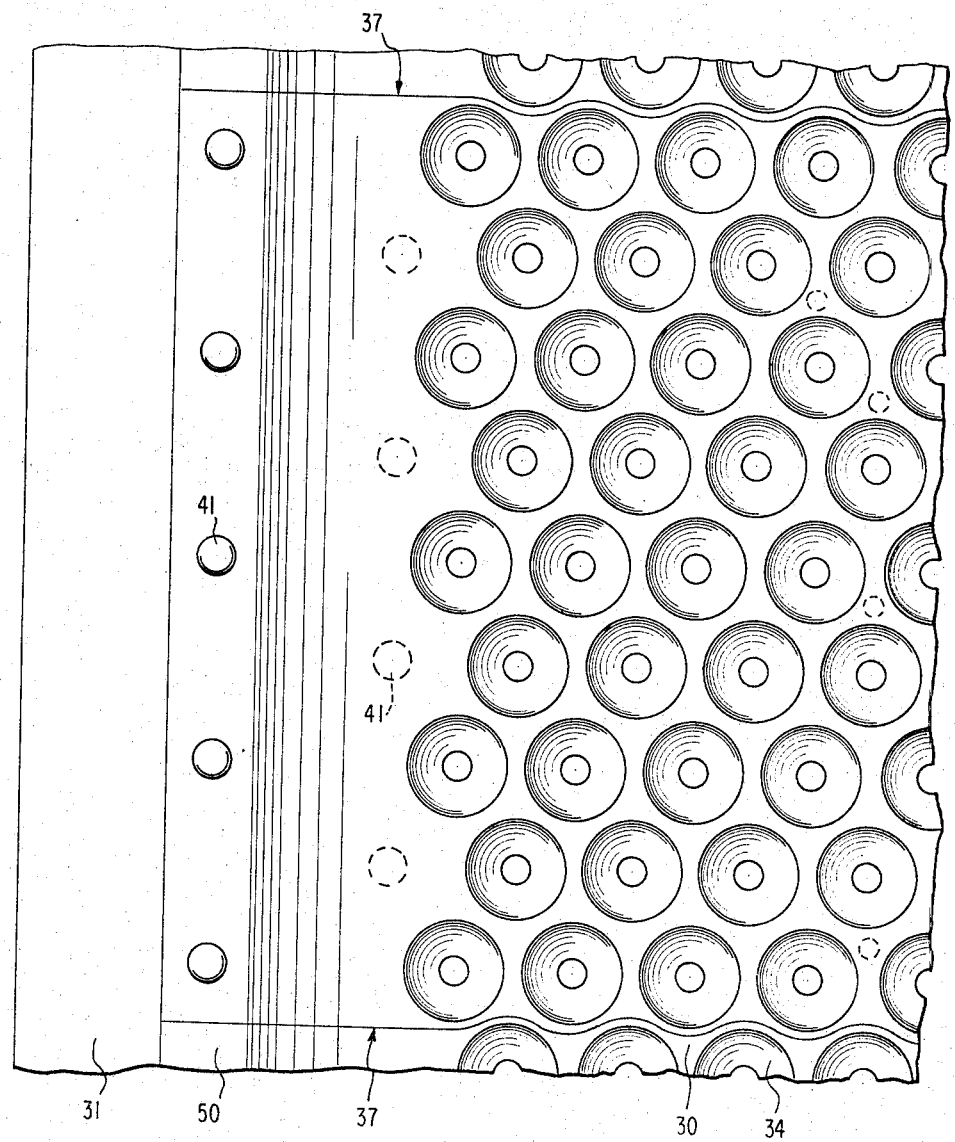
FIGURE 5 is a plan view of a portion of the belt.

Referring now to FIGURES 1 and 2, it will be seen that the belt 15 is endless and that its lower flight passes beneath a vacuum suction head or vacuum means 16. Pans 17 filled with a bakery product 18 are delivered by a conveyor 19 and the depanned product 18 is dropped onto a discharge conveyor 20 with the empty pans 17 continuing along on the first conveyor 19.

The belt comprises a product engaging skin 30 of predetermined thickness and softness to enable distortion thereof upon contact with the bakery product 18 as shown in FIGURES 3 and 4. The belt 15 also includes a rigid inner backing sheet 31 which has a plurality of holes 32 therethrough for registry with the small internal openings 33 of the closely spaced conical passages 34 through the product engaging skin 30.

While the holes 32 in the backing sheet 31 shown in FIGURES 3 and 4 are the same size and shape as the internal openings 33 of the conical passages 34, it is preferred that the holes 32 be of larger size to facilitate registry with replaceable transverse mats 40, as shown in FIGURE 2. Each mat 40 has connecting means 41 along its longitudinal edges and the backing sheet 31 has cooperating connecting means 42. In the embodiment shown in FIGURE 2, these are in the form of grippers 41 on an intermediate rigid backing section 50 which are received in sockets 42 in the base or inner backing sheet 31.

Preferably, the exposed surface of the product engaging skin 30 including the walls 35 of the conical passages 34 are coated or treated to provide a smooth wearing face 36 which is pliable and more dense than the internal body of the skin 30. It will be understood that the transverse mats 40 can be easily removed and cleaned in keeping with the high sanitary codes established for bakery equipment. Preferably, the transverse end walls of the transverse mats are similarly treated. Because of the high density of individual conical passages 34, the transverse parting line 37 between mats will be wigglily, as shown in a somewhat exaggerated fashion in FIGURE 1.

It will be noted that in FIGURES 3 and 4 the bakery products are in bread pans and roll baking trays respectively and that the belts are not the replaceable mat type.

In analyzing the unique capability of the instant belt, it has been determined that with all other design features and capabilities being otherwise the same the instant invention will provide about twice the lifting power of the bellows type suction cup belt in use in many bakeries today. A typical bellows type suction cup belt installation is shown in the U.S. Patent No. 3,170,581 entitled, "Depanning Apparatus," of 1965. An analysis regarding this superior capability is as follows:

(1) In a belt area 7 inches by 20 inches there are 60 bellows suction cups, each having a product engaging opening 1 inch in diameter and an internal opening 3/8 inch in diameter; the total lifting area is 60 times 0.7854 (area of 1 inch diameter hole) or 47.12 square inches.

(2) The instant invention compressible foam belt in the same 7 by 20 inch area provides 203 passages, each with a product engaging opening 3/4 inch in diameter and an internal opening 3/16 inch in diameter; the total lifting area is 203 times 0.4417 (area of 3/4 inch diameter hole) or 89.67 square inches.

(3) At a pressure of 0.5 inch of mercury, the flow through the 3/8 inch internal hole of the suction cup is 5 cubic feet per minute; the total flow through the 60 cups is therefore 60 times 5 or 300 cubic feet per minute.

(4) At the same pressure of 0.5 inch of mercury, the flow through the 3/16 inch internal hole of the compressible foam belt is 1.48 cubic feet per minute; the total flow through the 203 passages is therefore 203 times 1.48 or the same 300 cubic feet per minute.

(5) Since 0.5 inch of mercury equals 1/4 pound per square inch the total lifting power of the suction cup belt area chosen for analysis is 47.12 square inches times ¼ pound per square inch or 11.78 pounds.

(6) For comparison, the same belt area of the instant compressible foam belt provides a lifting force of 89.66 square inches times ¼ pound per square inch or 22.41 pounds.

Therefore, with in effect the same basic equipment, the instant high density passage design formed in a compressible foam belt will provide approximately double the lifting power of the bellows type discrete suction cup belt. Various other shapes can be designed which in effect would be equivalent to the conical wall passages specifically disclosed. It should be noted also that the total cubic feet per minute flow for both the bellow cup belt and the compressible foam belt of this invention are approximately the same for any given pressure.

The mat modification of the instant invention is also shown in FIGURE 5 and it will be seen that passages 34 are closely spaced to present a large number thereof to a bakery product. Also, it will be noted that grippers 41 are spread throughout the interior of the belt to insure a sound interlock of the units and to assist in the provision of an air tight conduit through the entire thickness of the belt.

While the invention has been described in terms of certain embodiments and examples, these are to be considered as illustrative rather than limiting and it is desired to cover all modifications and further embodiments that fall within the spirit and scope of the appended claims.

I claim:
1. In a bakery product transfer device, an endless belt for engaging and suspending through vacuum a product comprising a product engaging skin of predetermined thickness and softness to enable deforming contact therewith the product, and an inner backing sheet, said product engaging skin having a plurality of closely spaced conical passages therethrough, the larger external openings of said conical passages being of a predetermined size such that each product is exposed to the suspending action of a plurality of conical passages, the exposed surface of said product engaging skin including the walls of the conical passages being pliable and more dense than the interior body of the skin to present a smooth wearing face to the product, said inner backing sheet having a similar number of respective holes, therethrough in respective alignment with said conical passages, and vacuum means for producing a vacuum at said skin by drawing air through said openings.

2. In a bakery product transfer device as defined in claim 1 and wherein the holes in said backing sheet are larger than the internal openings of said conical passages to facilitate alignment.

3. In a bakery product transfer device as defined in claim 2 and wherein said product engaging skin includes a plurality of transverse mats each mat having an intermediate rigid backing section with connecting means along the longitudinal edges of said section, said backing sheet having cooperating connecting means along its longitudinal edges to provide for the removable mounting of said mats thereon.

References Cited

UNITED STATES PATENTS 3,168,958  2/1965  Grossi _____ 198—179 X

EDWARD A. SROKA, *Primary Examiner.*